Sept. 12, 1961 A. J. DE VRIES ET AL 2,999,900

SIGNAL TRANSLATING APPARATUS

Filed May 27, 1957 3 Sheets-Sheet 1

Inventors
Adrian J. De Vries
Walter S. Druz
By John J. Pederson
Attorney

Sept. 12, 1961 A. J. DE VRIES ET AL 2,999,900

SIGNAL TRANSLATING APPARATUS

Filed May 27, 1957 3 Sheets-Sheet 2

Inventors
Adrian J. De Vries
Walter S. Druz
By John J. Pederson
Attorney

Inventors
Adrian J. De Vries
Walter S. Druz
By John J. Pederson
Attorney

United States Patent Office 2,999,900
Patented Sept. 12, 1961

2,999,900

SIGNAL TRANSLATING APPARATUS

Adrian J. De Vries, Yorkfield Township, Du Page County, and Walter S. Druz, Bensenville, Ill., assignors to Zenith Radio Corporation, a corporation of Delaware Filed May 27, 1957, Ser. No. 661,804
14 Claims. (Cl. 179—1.5)

This invention pertains in general to a signal-translating apparatus, and more particularly to a bi-directional transistor switching arrangement for selecting between two input signals. It is particularly advantageous when employed as an encoding apparatus for the audio signal in a secrecy communication system, such as a subscription television system, and for that reason will be described in that connection. Since the encoding apparatus may be incorporated in either a transmitter or receiver, the term "encoding" is used herein in its generic sense to encompass either coding at the transmitter or decoding at the receiver.

In one prior secrecy communication scheme, an intelligence signal, such as an audio signal, is coded at the transmitter by alternately transmitting two oppositely phased audio signals. Phase inversion is carried out in accordance with a predetermined secret coding schedule. In order to achieve accurate reproduction of the sound at a television receiver, it is therefore necessary to invert portions of the received signal with respect to other portions in accordance with the same coding schedule. Such encoding may be achieved by employing a selector switch, in the form of an electron-discharge device, to which is applied the audio signal in phase opposition. A rectangular-shaped selecting signal having amplitude variations representing the code schedule is applied to the selector in order to effect selection of the two audio signals in alternation for application of a single, continuous signal to a load circuit.

While this encoding method is adequate in that it does effectively scramble or unscramble the audio information, the described arrangement is plagued with the disadvantage that it is difficult to avoid the occurrence of a spurious, undesired signal in the load which consists of potential fluctuations at the rate of inversions or switching. This undesired switching component is caused by a drifting or changing of the operating characteristics of the electronic switch and may be attributable to several different factors. For example, if the control potentials applied to the switch vary, the operating characteristics will likewise change. Consequently, an extremely close degree of control as to the amplitudes of the applied potentials is required. As another example, drifting of the operating characteristics of the switch may be effected by microphonics or mechanical vibrations that result in an actual displacement, be it ever so slight, of the physical electrodes or elements of the tube.

Unfortunately, in order to realize effective sound scrambling by the phase inversion method it is necessary that the phase inversions be carried out at frequencies lying in the audible range. Thus, the undesired switching-frequency signal component in the load produces audible distortion that detracts from the fidelity or listening quality of the unscrambled audio.

The present invention provides a switching arrangement that overcomes the shortcomings of the tube-type selector by employing a novel bi-directional transistor circuit. In the first place, the transistors are not subject to microphonics. Moreover, only one operating or control potential is employed and the circuit is so arranged that if its magnitude varies it will have no bearing on the output signal and will not produce a switching component.

It is an object of the invention, therefore, to provide a new and improved signal-translating apparatus which avoids the problems and difficulties of the previous arrangements as set forth above.

It is another object of the invention to provide a bi-directional transistor switching arrangement which effectively avoids the super-positioning of switching-frequency voltage fluctuations upon a translated signal.

It is still another object of the invention to provide a new and improved encoding apparatus for a secrecy communication system.

A signal-translating apparatus, constructed in accordance with the invention, comprises a source of intelligence signal. A pair of bi-directional transistors are provided each having first, second and third terminals and responsive to one voltage condition on the third terminal for assuming a conductive state wherein a relatively low impedance path is provided between its first and second terminals to permit bi-directional current translation therebetween and responsive to another voltage condition on the third terminal for assuming a non-conductive state wherein a relatively high impedance path is provided between its first and second terminals to prevent the translation of current therebetween. Means coupling the intelligence signal source to the first terminal of each of the transistors are provided for applying the intelligence signal thereto. A common load circuit is provided along with means coupling both the second terminals to the load circuit. Means are included for developing an alternating switching signal, and there are also means for applying the switching signal to the third terminal of each of the transistors to condition them to their respective conductive states in alternation thereby to translate the intelligence signal to the load circuit through the transistors in alternation, the non-conductive transistor translating undesired leakage current from the switching-signal-developing means to the load circuit to produce an undesired switching signal component in the load circuit. Finally, the signal-translating apparatus includes means coupled to the load circuit for cancelling the switching signal component.

The features of this invention which are believed to be new are set forth with particularity in the appended claims. The invention, together with further objects and advantages thereof, may best be understood, however, by reference to the following description in conjunction with the accompanying drawings, in which:

Figure 1:
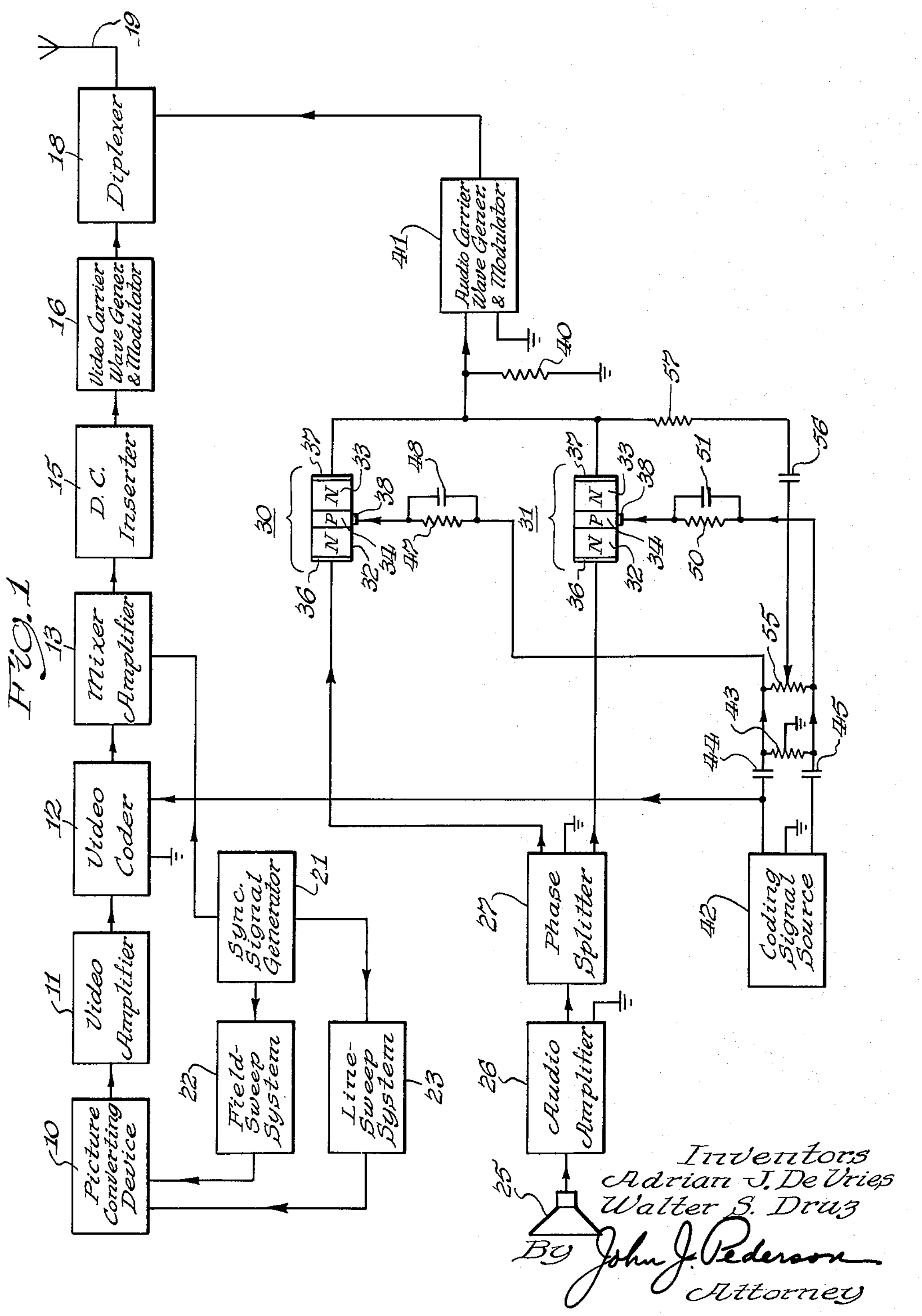
FIGURE 1 is a schematic representation of a subscription television transmitter including a coding apparatus constructed in accordance with one embodiment of the invention.

The transmitter of FIGURE 1 includes a picture-converting or pick-up device 10 which may be of any well known construction for deriving a video signal representing an image to be televised. The output terminals of device 10 are connected through a video amplifier 11 and a video coder 12 to one pair of input terminals of a mixer amplifier 13. Video coder 12 may be similar to that disclosed and claimed in Patent 2,758,153, issued August 7, 1956 to Robert Adler, and assigned to the present assignee. It may comprise a beam-deflection tube having a pair of collector anodes connected respectively to a pair of output circuits which may be selectively interposed into the video channel as the electron beam is deflected from one to the other of the two anodes. One of these output circuits includes a delay line so that the timing of the video components relative to the synchronizing components of the radiated television signal varies as the beam of the deflection tube is switched between its anodes. This switching effect is accomplished by means of a beam deflection-control or actuating signal applied to video coder 12, as will be explained. Varying the relative timing of the video and synchronizing components from time to time effectively codes the picture information since conventional television receivers, not containing video decoding apparatus, require a constant time relation between the video and synchronizing components to effect faithful image reproduction.

Mixer 13 is coupled through a direct current inserter 15 to a video carrier wave generator and modulator 16 which, in turn, is connected through a diplexer 18 to an antenna 19. The transmitter also includes a synchronizing-signal generator 21 which supplies the customary field- and line-synchronizing components and associated pedestal or blanking components to mixer 13. Generator 21 further supplies field- and line-drive pulses to a field-sweep system 22 and to a line-sweep system 23, respectively. The output terminals of sweep systems 22 and 23 are connected respectively to the field- and line-deflection elements (not shown) associated with picture converting device 10.

A microphone 25 is connected through an audio amplifier 26 to a phase splitter 27 which has a balanced output circuit supplying signals in push-pull relation or phase opposition to a pair of bi-directional transistors 30, 31. These transistors are of the conventional junction type and are of the same gender; for convenience, transistors 30 and 31 are illustrated as being of the NPN type, although it will be appreciated that similar results may be achieved with a pair of PNP transistors. Each has first and second outer zones 32, 33 of one conductivity type, namely N type material, on opposite sides of and contiguous with an intermediate zone 34 of the opposite conductivity type, namely P type material. Substantially ohmic terminals or connections 36, 37 and 38 are made to the three zones 32, 33, 34, respectively, of each transistor 30, 31.

As is inherent in the operation of a conventional junction-type transistor, each of transistors 30, 31 is responsive to the forward biasing of its intermediate zone 34 with respect to both of its outer zones (for the case of an NPN transistor, the forward biased condition is that in which intermediate zone 34 is positive with respect to zones 32 and 33) for assuming a conductive state wherein a relatively low impedance path is provided between its first and second outer zones 32, 33, respectively, to permit bi-directional current translation therebetween. On the other hand, each of NPN transistors 30, 31 responds to the reverse biasing of its intermediate zone (namely by establishing zone 34 at a negative potential with respect to both of its outer zones) for assuming a non-conductive state wherein a relatively high impedance path is provided between its first and second outer zones 32, 33 to prevent the translation of current therebetween.

One side of the balanced output circuit of phase splitter 27 is connected to terminal 36 of transistor 30 and the other side is connected to terminal 36 of transistor 31 so that the audio signal is applied with opposed phases to the first outer zones 32. The two terminals 37 are connected in common and to one side of a load resistor 40, the other side of which is connected to a plane of reference potential such as ground, so that both of the second outer zones 33 of the transistors are coupled to the load. Resistor 40 is coupled across the input terminals of an audio carrier wave generator and modulator 41 which in turn is coupled to another input circuit of diplexer 18.

In order to achieve both sound and picture coding in accordance with a secret code schedule, a coding or switching signal source 42 is provided to produce a phase-modulated rectangular shaped coding signal. The manner in which the alternating coding signal may be developed and information concerning its phase or other significant characteristic may be conveyed to subscriber receivers is entirely immaterial to the present invention. Attention is directed to copending applications Serial No. 366,727, filed July 8, 1953, and issued September 16, 1958, as Patent 2,852,598, in the name of Erwin M. Roschke; Serial No. 370,174, filed July 24, 1953, and issued October 27, 1959 as Patent 2,910,526, in the name of Walter S. Druz; and Serial No. 479,170, filed December 31, 1954, in the name of Erwin M. Roschke, all of which are assigned to the present assignee, and any one of which discloses a coding signal source suitable for use as unit 42. The phase-modulated coding or switching signals developed in the coding signal source exhibit mean frequencies lying in the audible range and consequently will result in audible distortion if a switching frequency component is permitted to be superimposed on the coded audio developed for transmission to the receivers.

Source 42 has a balanced output circuit to provide oppositely-phased output signals. The two output terminals are connected together through a series arrangement comprising a condenser 44, a resistor 43 center tapped to ground, and a condenser 45. Only one of the output signals is needed to effect actuation of video coder 12 and thus only one terminal of the balanced output of source 42 is connected to the deflection elements of coder 12. Since transistors 30, 31 are of the same gender and inasmuch as they must be turned "on" and "off" in alternation, both of the oppositely-phased signals are employed. Thus, the junction between condenser 44 and resistor 43 is connected to terminal 38 of transistor 30 via a parallel combination of a current-limiting resistor 47 and a condenser 48; this condenser is provided to "sharpen" the amplitude excursions of the rectangular shaped switching signal Likewise, the junction between condenser 45 and resistor 43 is connected to terminal 38 of transistor 31 through a current limiting resistor 50 which is by-passed by a condenser 51. This condenser serves the same purpose as condenser 48. In order to cancel an undesired switching signal component that may be developed in load circuit 40 in a manner to be explained, a potentiometer 55 is bridged across resistor 43, and the variable tap of the potentiometer is connected through a condenser 56 and a resistor 57 to the ungrounded terminal of load resistor 40.

In the operation of the described subscription television transmitter, picture-converting device 10 develops a video signal representing the program information to be televised, and this signal, after amplification in video amplifier 11, is supplied through video coder 12 to mixer amplifier 13. Meanwhile, coding signal source 42 develops a rectangular-shaped alternating coding signal having two different amplitude levels for application to the deflection-control elements of the video coder in order effectively to vary the time relationship between the video components and the synchronizing components of the radiated signal. Mixer 13 also receives the usual line- and field-synchronizing and blanking pulses from generator 21 so that a coded composite television signal is developed therein. That signal is adjusted as to background level in direct current inserter 15 and is amplitude modulated on a picture carrier in unit 16. The modulated carrier is supplied through diplexer 18 to antenna 19 from which it is transmitted to subscriber receivers. Sweep systems 22 and 23 are synchronized by generator 21 in well known manner.

At the same time, the audio information accompanying the video information is picked up by microphone 25 and supplied through audio amplifier 26 to phase splitter 27 for application to terminals 36 of transistors 30, 31 in push-pull or phase opposition. Meanwhile, the alternating switching signal developed in source 42 is applied in phase opposition to terminals 38 of the transistors in order to forward bias the transistors to their respective conductive states in alternation, thereby to translate the opposed phases of audio to load resistor 40 in alternation, In other words, during each half cycle of the switching signal in which intermediate zone 34 of transistor 30 is positive with respect to its outer zones, that transistor is keyed "on" to translate the audio therethrough. During the same half-cycle interval, intermediate zone 34 of transistor 31 is established at a negative voltage condition with respect to its outer zones rendering that transistor non-conductive. During the intervening half cycles the opposite conditions prevail and transistor 31 is "on" and transistor 30 is "off."

However, the transistor that is instantaneously non-conductive or "turned off" translates undesired leakage current through load circuit 40 while at the same time the other transistor, being in its conductive state, translates undesired bias current, or what is sometimes known as base current, through the load circuit in a direction opposite to that of the leakage current.

There is not a complete cancellation for the obvious reason that the bias current from the conductive transistor is not equal to the leakage current from the non-conductive one. In practice, the leakage current is usually smaller. If the two transistors were identical in construction and the circuitry were completely balanced, the signal component resulting from the leakage and bias currents would have the same magnitude and flow in the same direction for each half cycle of the alternating switching signal. In other words, the undesired signal component in resistor 40 would have the same magnitude and direction no matter which one of transistors 30, 31 were in its conductive state. In that event, there would be no voltage fluctuations in the load at the switching frequency.

However, as a practical matter the transistors are usually not precisely the same in composition and the circuits are ordinarily not exactly balanced and thus voltage fluctuations are developed in load resistor 40 having a wave shape substantially the same as that of the alternating switching signal from coding signal source 42. In accordance with the invention, a compensating signal having a wave shape corresponding to that of the undesired switching component in resistor 40 is derived from coding signal source 42 and applied to load resistor 40 to cancel the undesired switching component. Since the coding signal is applied in push-pull across potentiometer 55, its center is effectively at ground or reference potential and thus the variable tap of potentiometer 55 may be manually adjusted to provide a compensating signal having the same wave shape and magnitude as the switching signal component in load 40 but of opposite phase with respect thereto. Moving the tap from one side of the center of potentiometer 55 to the other reverses the polarity or phase of the compensating signal, so that a compensating signal of the required magnitude and phase for any operating condition can readily be obtained.

By selecting portions of the two opposed phases of the audio signal applied to the transistors in accordance with a code schedule so that the audio is alternately translated to load resistor 40 with no phase change and with a phase inversion, effective scrambling is achieved. A coded audio signal is thus developed containing phase inversions that completely destroy its intelligibility. The coded audio signal is then applied to sound carrier unit 41 wherein it is employed to modulate an audio carrier. The modulated carrier is then applied through diplexer 18 to antenna 19, from which it is concurrently radiated with the video modulated carrier.

It will be appreciated that potentiometer 55 usually only requires an initial "factory" adjustment in order to provide for proper cancellation of the switching-frequency voltage fluctuations. Of course, if any of the transistors or circuit components require replacement at a later date, it may be necessary to re-adjust the potentiometer. However, since the transistors are not vulnerable to microphonics or mechanical vibrations, there is no possibility of variations in the operating characteristics as in vacuum tube circuits which would have the deleterious result of producing switching fluctuations in the load. Additionally, there is only one control potential applied to transistors 30, 31 (namely, the alternating switching signal) and while this may vary in magnitude from time to time to change the magnitude of the switching component in load resistor 40, the amplitude of the compensating signal from potentiometer 55 also varies accordingly so that cancellation is still realized. Consequently, there is no possibility of introducing switching fluctuations in the load due to potential variations.

Figure 2:
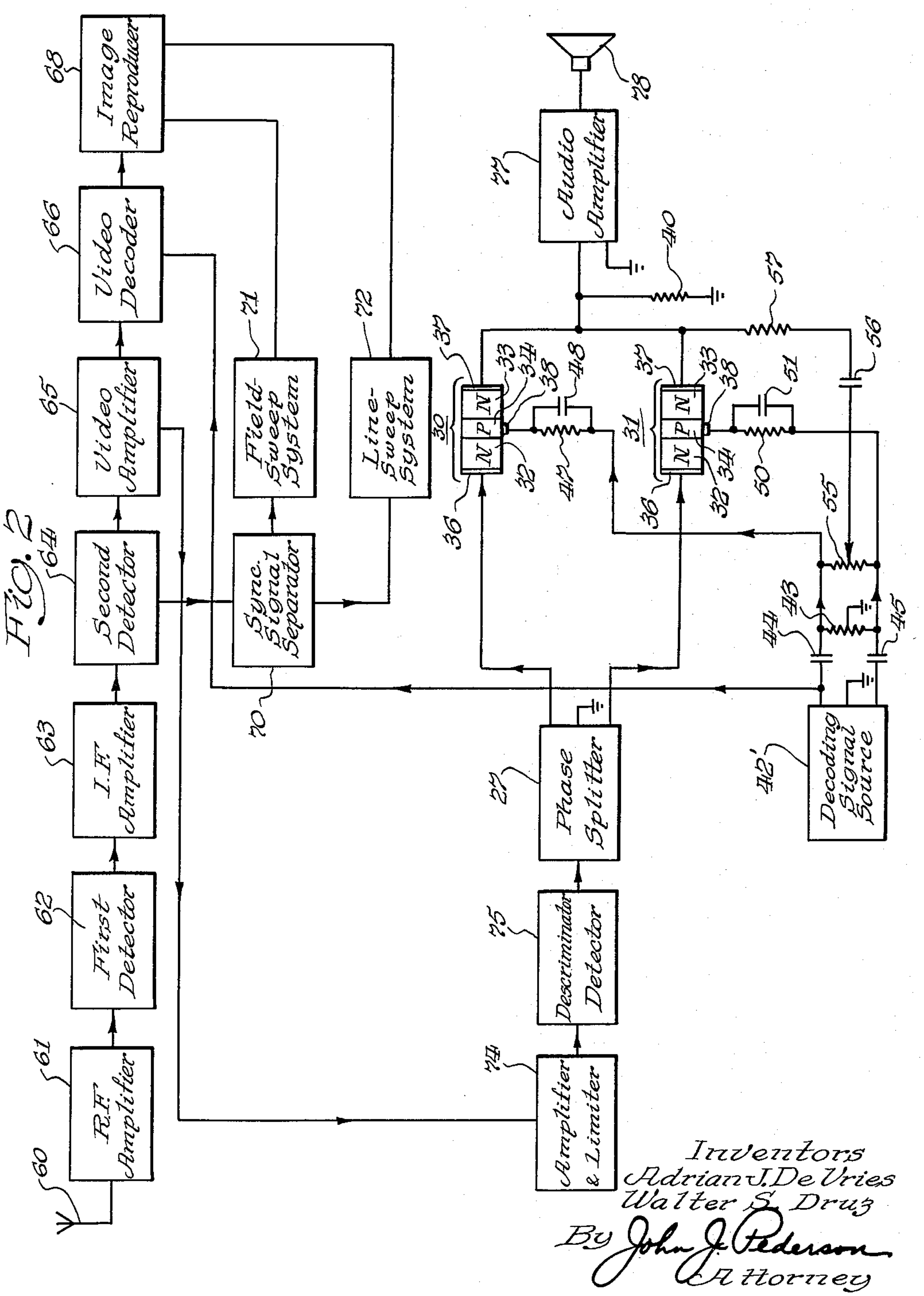
FIGURE 2 represents a subscription television receiver constructed to operate in conjunction with the transmitter of FIGURE 1; and, FIGURE 3 illustrates a portion of the transmitter of FIGURE 1, constructed in accordance with another embodiment of the invention.

Turning now to the subscription television receiver of FIGURE 2 which is constructed to decode the coded video and audio signals radiated by the transmitter of FIGURE 1, an antenna 60 is connected to a radio-frequency amplifier 61 which is connected in turn to a first detector 62 having its output connected to an intermediate-frequency amplifier 63. This amplifier is connected to a second detector 64 having output terminals connected to a video amplifier 65. This amplifier is connected through a video decoder 66 to the input electrodes of a cathode-ray image-reproducing device or picture tube 68. Video decoder 66 is, of course, similar to video coder 12 at the transmitter and is controlled to operate in a complementary fashion in order to compensate for variations in the timing of the video and synchronizing components of the received television signal. Specifically, when a delay is introduced between a line-synchronizing component and the video information occurring during the immediately following line-trace interval, the received video is translated through video decoder 66 with no delay. On the other hand, when no delay is introduced at the transmitter between line-synchronizing and video components, a delay is introduced in video decoder 66.

Second detector 64 is also coupled to a synchronizing-signal separator 70 having output circuits connected to a field-sweep system 71 and a line-sweep system 72 connected in turn to associated deflection elements (not shown) associated with picture tube 68.

Video amplifier 65 is also coupled through an amplifier and amplitude limiter 74 and a discriminator detector 75 to a phase splitter 27 corresponding to the identically numbered phase splitter in the transmitter of FIGURE 1. In fact, the switching circuitry connected to the receiver phase splitter is also identical to that illustrated in FIGURE 1, as indicated by the identical reference numerals assigned to corresponding elements. Load resistor 40 in the receiver of FIGURE 2 is coupled across the input terminals of an audio amplifier 77, the output of which is connected to a speaker 78.

A decoding signal source 42′ corresponds to similarly constructed coding signal source 42. A rectangular wave decoding signal developed in unit 42′ may be synchronized in phase with relation to the coding rectangular wave of the transmitter in a manner described in any of the aforementioned applications Serial Nos. 366,727, 370,174, 479,170.

In the operation of the described receiver, the coded television signal is picked-up by antenna 60, amplified in radio-frequency amplifier 61 and demodulated or heterodyned to the selected intermediate frequency in detector 62. The intermediate-frequency signal thereby developed is amplified in amplifier 63 and detected in detector 64 to produce the coded composite video signal. This latter signal is amplified in video amplifier 65, translated through video decoder 66, and applied to the input electrodes of image reproducer 68 to intensity modulate the electron beam in that device in conventional manner. Video decoder 66 receives a decoding signal from source 42′ which has amplitude variations occurring in exact time coincidence with amplitude excursions of the coding signal applied as a deflection-control signal to the video coder in the transmitter of FIGURE 1 so that the video components applied to picture tube 68 are effectively unscrambled to realize intelligible picture reproduction. The sweep systems 71 and 72 are, of course, operated in conventional manner.

An intercarrier sound signal is developed in detector 64 and separated from the video components in amplifier 65 in accordance with well understood practices in the art. The intercarrier signal is amplified and amplitude limited in unit 74, detected in demodulator or discriminator detector 75, and applied to phase splitter 27 to develop a coded audio signal with two different phases 180° apart for push-pull application to NPN transistors 30, 31. Decoding signal source 42′ renders the two transistors conductive in alternation in synchronism with the operation of the corresponding transistors at the transmitter so that the portions of the phase opposed audio signals selected for application to load resistor 40 in the receiver effectively constitute a simulation or replica of the original uncoded audio originally developed in amplifier 26 at the transmitter.

It should be realized that when the compensating arrangement of the present invention, comprising potentiometer 55 and the associated circuitry coupling potentiometer 55 to load resistor 40, is employed at the receiver, the corresponding network at the transmitter may be omitted without detracting from the quality of audio reproduction. To elucidate, if a switching signal component is permitted to be translated to load resistor 40 in the transmitter and consequently radiated to the receiver, the audio decoder phase inverts that same switching component so that it is effectively converted to a D.C. component which, of course, is not audible. However, one outstanding advantage in employing compensation at the transmitter resides in the elimination of any "telltale" voltage fluctuations in the radiated audio signal that will indicate or "give away" the coding schedule employed. This, of course, preserves the security aspects of the system against unauthorized pirating by persons bent on fraud.

Figure 3:
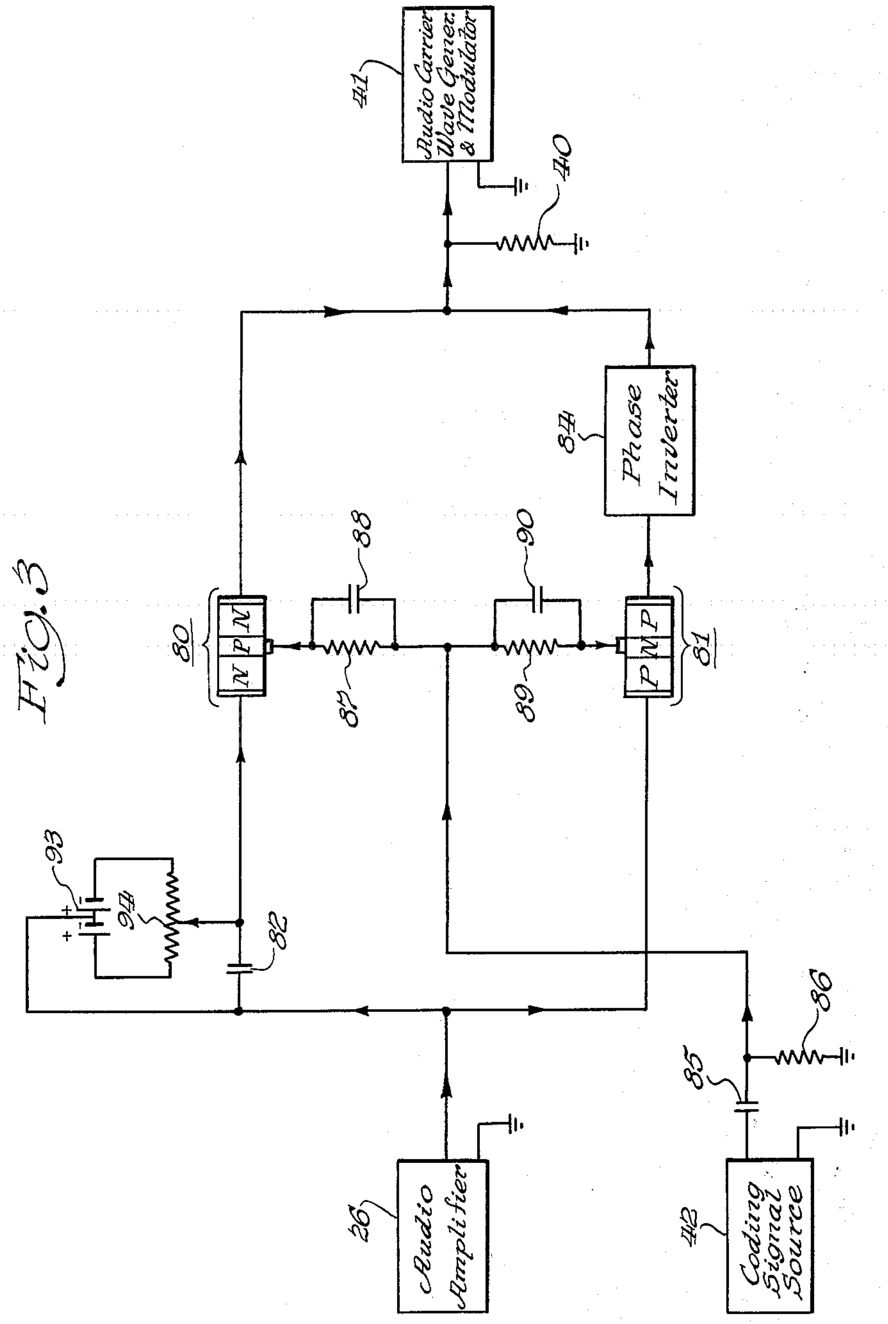

In accordance with the variant of the invention shown in FIGURE 3, phase splitter 27 is eliminated and the output of audio amplifier 26 is applied in like phase to two transistors 80, 81 of opposite gender, transistor 80 being of the conventional NPN type (like transistors 30, 31) and transistor 81 being of the conventional PNP type. Specifically, the single-ended output of amplifier 26 is connected through a condenser 82 to one of the outer zones of transistor 80, and the amplifier is directly connected to one of the outer zones of transistor 81. The other outer zone of transistor 80 is directly connected to one terminal of load resistor 40, and the other outer zone of transistor 81 is also connected to resistor 40 through a phase inverter 84. Because of the opposite gender transistors, only a single ended output signal having positive and negative half cycles from coding signal source 42 is required, and it is applied to a resistance-capacity coupling circuit comprising a condenser 85 and a resistor 86, the junction of these two components being coupled to the intermediate zones of transistors 80, 81 through parallel RC combinations 87, 88 and 89, 90 respectively.

To achieve compensation of any switching frequency signal that may be developed in load resistor 40, one terminal of condenser 82 is connected to the mid-point of a direct voltage source 93, across which is connected a potentiometer 94, and the other terminal of condenser 82 is connected to the tap of that potentiometer. In this way, a direct voltage of either polarity and of any amplitude within a range may be applied to the signal input terminal of transistor 80.

In the operation of the FIGURE 3 embodiment, since the transistors are of opposite gender the same alternating switching signal keys transistors 80, 81 "on" and "off" in alternation. Thus, the audio signal is effectively translated through phase inverter 84 to load 40 during some intervals, namely during the half cycles when the rectangular signal exhibits its negative amplitude, to render transistor 81 conductive and transistor 80 non-conductive, and is translated through transistor 80 during the intervening intervals when the rectangular coding signal exhibits its positive amplitude level to effectively turn transistor 80 "on" and 81 "off". Of course, phase inverter 84 may instead be interposed in the output circuit of transistor 80 rather than 81.

In order to effect cancellation of any undesired switching signal component in load resistor 40, D.C. source 93 and potentiometer 94 introduce a compensating signal having the same wave shape as the switching component. This obtains because transistor 80 is intermittently rendered conductive and thus the direct voltage introduced by source 93 is only applied to load 40 intermittently. With the center-tapped arrangement of source 93, potentiometer 94 may be adjusted to produce a signal that not only has the same magnitude as the undesired switching component but is of opposite phase with respect thereto. Of course, condenser 82, source 93 and potentiometer 94 may instead be inserted in the circuit coupling amplifier 26 to transistor 81.

It will thus be apparent that several features of the FIGURE 1 embodiment have been modified in the variant of the invention shown in FIGURE 3. Specifically, by employing phase inverter 84, a single-ended audio signal may be directly utilized. Moreover, by utilizing transistors of opposite gender only a single ended output of the coding signal source is necessitated. Additionally, the compensation effect of the invention is achieved by providing a D.C. source coupled to load resistor 40 through transistor 80, rather than by deriving a compensating signal directly from the coding signal source. Of course, the coding apparatus of FIGURE 3 may serve as a decoding apparatus in the receiver of FIGURE 2 and it is not necessary to employ identical encoding circuitry at transmitter and receiver in an operating system. For example, either of the disclosed encoding circuits may be employed at the transmitter and the other at the receiver.

The invention provides, therefore, an improved signal-translating apparatus which features a pair of bi-directional transistors which are rendered conductive in alternation under the control of an alternating switching signal to translate an intelligence signal through the transistors in alternation to a load circuit, and wherein any undesired switching frequency signal component that may be developed in the load circuit is effectively cancelled out.

While particular embodiments of the invention have been shown and described, modifications may be made, and it is intended in the appended claims to cover all such modifications as may fall within the true spirit and scope of the invention.

We claim:

1. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each said transistors for applying said intelligence signal thereto; a common load circuit; means coupling both said second terminals to said load circuit; means for developing an alternating switching signal; means for applying said switching signal to said third terminal of each of said transistors to condition said transistors to their respective conductive states in alternation thereby to translate said intelligence signal to said load circuit through said transistors in alternation, the non-conductive transistor translating undesired leakage current from said switching-signal-developing means to said load circuit to produce an undesired switching signal component in said load circuit; and means coupled to said load circuit for cancelling said switching signal component.

2. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each of said transistors for applying said intelligence signal thereto; a common load circuit; means coupling both said second terminals to said load circuit; means for developing an alternating switching signal exhibiting a rectangular wave shape having two different amplitude levels; means for applying said switching signal to said third terminal of each of said transistors to condition said transistors to their respective conductive states in alternation in response to each amplitude variation of said switching signal thereby to translate said intelligence signal to said load circuit through said transistors in alternation, the non-conductive transistor translating undesired leakage current from said switching-signal-developing means to said load circuit to produce an undesired switching signal component in said load circuit; and means coupled to said load circuit for cancelling said switching signal component.

3. An encoding apparatus for a secrecy communication system comprising: a source of audio signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said audio signal source to said first terminal of each of said transistors for applying said audio signal thereto; a common load circuit; means coupling both said second terminals to said load circuit; means for developing an alternating encoding signal exhibiting a rectangular wave shape with its amplitude variations representing a predetermined code schedule; means for applying said encoding signal to said third terminal of each of said transistors to condition said transistors to their respective conductive states in alternation in response to each amplitude variation of said encoding signal thereby to translate said audio signal to said load circuit through said transistors in alternation effectively to invert the phase of said audio signal at intervals determined by said code schedule to achieve encoding, the non-conductive transistor translating undesired leakage current from said encoding-signal-developing means to said load circuit to produce an undesired encoding signal component in said load circuit; and means coupled to said load circuit for cancelling said encoding signal component.

4. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to both of said first terminals for continuously and simultaneously applying said intelligence signal thereto; a common load circuit; means coupling both said second terminals to said load circuit; means for developing an alternating switching signal; means for continuously and simultaneously applying said switching signal to both of said third terminals to condition said transistors to their respective conductive states in alternation thereby to translate said intelligence signal to said load circuit through said transistors in alternation, the non-conductive transistor translating undesired leakage current from said switching-signal-developing means to said load circuit to produce an undesired switching signal component in said load circuit; and means coupled to said load circuit for cancelling said switching signal component.

5. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each of said transistors for applying said intelligence signal thereto; a common load circuit; means coupling both said second terminals to said load circuit; means for developing an alternating switching signal; means for applying said switching signal to said third terminal of each of said transistors to condition said transistors to their respective conductive states in alternation thereby to translate said intelligence signal to said load circuit through said transistors in alternation, the non-conductive transistor translating undesired leakage current from said switching-signal-developing means to said load circuit and the conductive transistor translating undesired bias current from said switching-signal-developing means to said load circuit both of which combine to produce an undesired switching signal component in said load circuit; and means coupled to said load circuit for cancelling said switching signal component.

6. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each of said transistors for applying said intelligence signal thereto; a common load circuit; means coupling both said second terminals to said load circuit; means for developing an alternating switching signal; means for applying said switching signal to said third terminal of each of said transistors to condition said transistors to their respective conductive states in alternation thereby to translate said intelligence signal to said load circuit through said transistors in alternation, the non-conductive transistor translating undesired leakage current from said switching-signal-developing means to said load circuit to produce an undesired switching signal component in said load circuit; and means coupled between said intelligence signal source and said load circuit for cancelling said switching signal component.

7. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each of said transistors for applying said intelligence signal thereto; a common load circuit; means coupling both said second terminals to said load circuit; means for developing an alternating switching signal; means for applying said switching signal to said third terminal of each of said transistors to condition said transistors to their respective conductive states in alternation thereby to translate said intelligence signal to said load circuit through said transistors in alternation, the non-conductive transistor translating undesired leakage current from said switching-signal-developing means to said load circuit to produce an undesired switching signal component in said load circuit; and means coupled between said switching-signal-developing means and said load circuit for cancelling said switching signal component.

8. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each of said transistors for applying said intelligence signal thereto; a common load circuit; means coupling both said second terminals to said load circuit; means for developing an alternating switching signal; means for applying said switching signal to said third terminal of each of said transistors to condition said transistors to their respective conductive states in alternation thereby to translate said intelligense signal to said load circuit through said transistors in altetrnation, the non-conductive transistor translating undesired leakage current from said switching-signal-developing means to said load circuit to produce an undesired switching signal component, having a predetermined wave shape, in said load circuit; and means for applying a compensating signal, having the same wave shape as said switching signal component but of opposite phase with respect thereto, to said load circuit for cancelling said switching signal component.

9. Signal-translating apparatus comprising: a source of intelligence signal; a pair of bi-directional transistors each having first, second and third terminals and responsive to one voltage condition on said third terminal for assuming a conductive state wherein a relatively low impedance path is provided between its first and second terminals to permit bi-directional current translation therebetween and responsive to another voltage condition on said third terminal for assuming a non-conductive state wherein a relatively high impedance path is provided between its first and second terminals to prevent the translation of current therebetween; means coupling said intelligence signal source to said first terminal of each of said transistors for applying said intelligence signal thereto; a common load circuit; means coupling both said second terminals to said load circuit; means for developing an alternating switching signal; means for applying said switching signal to said third terminal of each of said transistors to condition said transistors to their respective conductive states in alternation thereby to translate said intelligence signal to said load circuit through said transistors in alternation, the non-conductive transistor tranlating undesired leakage current from said switching-signal-delevoping means to said load circuit to produce an undesired switching signal component of predetermined wave shape and magnitude in siad load circuit; and means including a potentiometer for applying a compensating signal, having the same wave shape as said switching signal component but of opposite phase with respect thereto, to said load circuit, said potentiometer being adjustable to vary the magnitude of said compensating signal applied to said load circuit to equal the magnitude of said switching signal component to effect cancellation thereof.

10. Signal-translating apparatus comprising: a source of intelligence signal; a pair of bi-directional transistors each having first and second outer zones of one conductivity type on opposite sides of and contiguous with an intermediate zone of the opposite conductivity type and each responsive to the forward biasing of its intermediate zone with respect to both of its outer zones for assuming a conductive state wherein a relatively low impedance path is provided between its first and second outer zones to permit bi-directional current translation therebetween and responsive to the reverse biasing of its intermediate zone with respect to both of its outer zones for assuming a non-conductive state wherein a relatively high impedance path is provided between its first and second outer zones to prevent the translation of current therebetween; means coupling said intelligence signal source to said first outer zone of each of said transistors for applying said intelligence signal thereto; a common load circuit; means coupling both said second outer zones to said load circuit; means for developing an alternating switching signal; means for applying said switching signal to said intermediate zone of each of said transistors to forward bias said transistors to their respective conductive states in alternation thereby to translate said intelligence signal to said load circuit through said transistors in alternation, the non-conductive transistor translating undesired leakage current from said switching-signal-developing means to said load circuit and the conductive transistor translating undesired bias current from said switching-signal-developing means to said load circuit both of which combine to produce an undesired switching signal component in said load circuit; and means for applying a compensating signal to said load circuit for cancelling said switching signal component.

11. Signal-translating apparatus comprising: a source of intelligence signal; a pair of bi-directional transistors of the same gender each having first and second outer zones of one conductivity type on opposite sides of and contiguous with an intermediate zone of the opposite conductivity type and each responsive to the forward biasing of its intermediate zone with respect to both of its outer zones for assuming a conductive state wherein a relatively low impedance path is provided between its first and second outer zones to permit bi-directional current translation therebetween and responsive to the reverse biasing of its intermediate zone with respect to both of its outer zones for assuming a non-conductive state wherein a relatively high impedance path is provided between its first and second outer zones to prevent the translation of current therebetween; means coupling said intelligence signal source to said first outer zone of each of said transistors for applying said intelligence signal thereto; a common load circuit; means coupling both said second outer zones to said load circuit; means for developing an alternating switching signal; means for applying said switching signal to the intermediate zone of one of said transistors in one phase and to the intermediate zone of the other of said transistors in opposite phase to forward bias said transistors to their respective conductive states in alternation thereby to translate said intelligence signal to said load circuit through said transistors in alternation, the non-conductive transistor translating undesired leakage current from said switching-signal-developing means to said load circuit and the conductive transistor translating undesired bias current from said switching-signal-developing means to said load circuit both of which combine to produce an undesired switching signal component in said load circuit; and means for applying a compensating signal to said load circuit for cancelling said switching signal component.

12. Signal-translating apparatus comprising: a source of intelligence signal; a pair of bi-directional transistors of opposite gender each having first and second outer zones of one conductivity type on opposite sides of and contiguous with an intermediate zone of the opposite conductivity type and each responsive to the forward biasing of its intermediate zone with respect to both of its outer zones for assuming a conductive state wherein a relatively low impedance path is provided between its first and second outer zones to permit bi-directional current translation therebetween and responsive to the reverse biasing of its intermediate zone with respect to both of its outer zones for assuming a non-conductive state wherein a relatively high impedance path is provided between its first and second outer zones to prevent the translation of current therebetween; means coupling said intelligence signal source to said first outer zone of each of said transistors for applying said intelligence signal thereto; a common load circuit; means coupling both said second outer zones to said load circuit; means for developing an alternating switching signal; means for applying said switching signal in like phase to the intermediate zones of both of said transistors to forward bias said transistors to their respective conductive states in alternation thereby to translate said intelligence signal to said load circuit through said transistors in alternation, the non-conductive transistor translating undesired leakage current from said switching-signal-developing means to said load circuit and the conductive transistor translating undesired bias current from said switching-signal-developing means to said load circuit both of which combine to produce an undesired switching signal component in said load circuit; and means for applying a compensating signal to said load circuit for cancelling said switching signal component.

13. Signal-translating apparatus comprising: a source of intelligence signal; a pair of bi-directional transistors each having first and second outer zones of one conductivity type on opposite sides of and contiguous with an intermediate zone of the opposite conductivity type and each responsive to the forward biasing of its intermediate zone with respect to both of its outer zones for assuming a conductive state wherein a relatively low impedance path is provided between its first and second outer zones to permit bi-directional current translation therebetween and responsive to the reverse biasing of its intermediate zone with respect to both of its outer zones for assuming a non-conductive state wherein a relatively high impedance path is provided between its first and second outer zones to prevent the translation of current therebetween; means coupled to said intelligence signal source for applying said intelligence signal in one phase to the first outer zone of one of said transistors and in opposite phase to the first outer zone of the other of said transistors; a common load circuit; means coupling both said second outer zones to said load circuit; means for developing an alternating switching signal; means for applying said switching signal to said intermediate zone of each of said transistors to forward bias said transistors to their respective conductive states in alternation thereby to translate said intelligence signal to said load circuit through said transistors in alternation, the non-conductive transistor translating undesired leakage current from said switching-signal-developing means to said load circuit and the conductive transistor translating undesired bias current from said switching-signal-developing means to said load circuit both of which combine to produce an undesired switching signal component in said load circuit; and means for applying a compensating signal to said load circuit for cancelling said switching signal component.

14. Signal-translating apparatus comprising: a source of intelligence signal; a pair of bi-directional transistors each having first and second outer zones of one conductivity type on opposite sides of and contiguous with an intermediate zone of the opposite conductivity type and each responsive to the forward biasing of its intermediate zone with respect to both of its outer zones for assuming a conductive state wherein a relatively low impedance path is provided between its first and second outer zones to permit bi-directional current translation therebetween and responsive to the reverse biasing of its intermediate zone with respect to both of its outer zones for assuming a non-conductive state wherein a relatively high impedance path is provided between its first and second outer zones to prevent the translation of current therebetween; means coupled to said intelligence signal source for applying said intelligence signal in like phase to the first outer zones of both of said transistors; a common load circuit; means coupling the second outer zone of one of said transistors to said load circuit; means including a phase inverter coupling the second outer zone of the other of said transistors to said load circuit; means for developing an alternating switching signal; means for applying said switching signal to said intermediate zone of each of said transistors to forward bias said transistors to their respective conductive states in alternation thereby to translate said intelligence signal to said load circuit through said transistor in alternation, the non-conductive transistor translating undesired leakage current from said switching-signal-developing means to said load circuit and the conductive transistor translating undesired bias current from said switching-signal-developing means to said load circuit both of which combine to produce an undesired switching signal component in said load circuit; and means for applying a compensating signal to said load circuit for cancelling said switching signal component.

References Cited in the file of this patent

UNITED STATES PATENTS

| | | |
|---|---|---|
| 2,579,302 | Carbrey | Dec. 18, 1951 |
| 2,656,406 | Gray et al. | Oct. 20, 1953 |
| 2,709,218 | Gabrilovitch | May 24, 1955 |
| 2,801,081 | Elliot | Oct. 15, 1957 |
| 2,816,238 | Elliot | Dec. 10, 1957 |
| 2,825,821 | Logue | Mar. 4, 1958 |
| 2,881,332 | Jensen | Apr. 7, 1959 |

OTHER REFERENCES

Appendix, Federal Communications Commission (Comments of Zenith Radio Corp. and Teco, Inc.) June 21, 1955.